United States Patent
Tolliver

(10) Patent No.: US 8,731,408 B2
(45) Date of Patent: May 20, 2014

(54) NETWORK SYSTEM WITH ENERGY EFFICIENT FIBER PORT

(75) Inventor: Eric W. Tolliver, Moorpark, CA (US)

(73) Assignee: Alcatel Lucent, Paris (FR)

( * ) Notice: Subject to any disclaimer, the term of this patent is extended or adjusted under 35 U.S.C. 154(b) by 345 days.

(21) Appl. No.: 13/113,442

(22) Filed: May 23, 2011

(65) Prior Publication Data
US 2012/0301138 A1    Nov. 29, 2012

(51) Int. Cl.
*H04B 10/25* (2013.01)
*H04B 10/03* (2013.01)

(52) U.S. Cl.
USPC .............................. 398/151; 398/1

(58) Field of Classification Search
USPC ................................. 398/1, 2, 151
See application file for complete search history.

(56) References Cited

U.S. PATENT DOCUMENTS

| | | | |
|---|---|---|---|
| 5,859,936 A * | 1/1999 | Ishikawa | 385/4 |
| 2004/0008996 A1 * | 1/2004 | Aronson et al. | 398/202 |
| 2004/0052518 A1 * | 3/2004 | Korotky et al. | 398/2 |
| 2006/0034608 A1 * | 2/2006 | Holmes et al. | 398/1 |
| 2012/0020675 A1 * | 1/2012 | Chuang et al. | 398/193 |

* cited by examiner

*Primary Examiner* — Nathan Curs
(74) *Attorney, Agent, or Firm* — Garlick & Markison; Holly L. Rudnick

(57) ABSTRACT

An approach for saving power in a fiber ports of a network system is provided. An instance of a period of inactivity for a fiber port of the network system is determined. Power delivery to a transmit laser of an SFP (small form-factor pluggable) device of the fiber port is terminated during at least a portion of the period of inactivity. Power delivery to the SFP device is maintained while power delivery to the transmit laser is terminated.

15 Claims, 5 Drawing Sheets

NETWORK SYSTEM WITH ENERGY EFFICIENT FIBER PORT

FIELD OF THE DISCLOSURE

The disclosures made herein relate generally to network systems with fiber ports and, more particularly, to energy efficient operation of fiber Ethernet network systems.

BACKGROUND

Energy consumption in a fiber Ethernet network systems is adversely impacted by fiber ports not going into a power savings mode when traffic on such ports is low or non-existent. Currently, the only available solution to this problem is a user-initiated command to power down a particular fiber port of a fiber Ethernet network system. This type of user-initiate solution is undesirable and inefficient due at least in part to a user having to determine periods of port inactivity, idle port periods are relatively short compared to the time of human intervention, and manual intervention cannot react if/when unplanned activity exists.

IEEE (Institute of Electrical and Electronics Engineers) 802.3az standard offers a protocol for providing power savings for copper Ethernet ports. However, IEEE 802.3az is specifically designed for copper ports and, thus, is not a solution for fiber ports. Solutions according to this standard can run on fiber ports, but there will be little to no power savings because lasers of the fiber ports would still be enabled and consuming power. Similarly, IEEE 802.11e applies only to wireless devices and not to fiber ports. This wireless-specific power savings standard provides for buffering of packets on one device until another device requests them. This buffering allows a handheld device to go into hibernate mode but not miss any packets.

It is also known that the standard design for Small Form Factor Pluggable devices (e.g., SFP and SFP+ devices) requires that a transmit laser of a fiber port be constantly on in order for the device at the other end of a connection to detect link/signal. In this manner, SFP devices currently do not turn off the laser to save power when no connection is present. Accordingly, the always-on requirement results in power consumption even in cases where the SFP device is not connected to another device.

Therefore, implementing power savings for fiber ports of an Ethernet network system in a manner that overcomes drawbacks associated with conventional power savings solutions for network system ports would be advantageous, desirable and useful.

SUMMARY OF THE DISCLOSURE

Embodiments of the present invention are directed to automatically switching a laser of a SFP device into a power savings mode dependent upon connectivity conditions for the SFP device. In one embodiment of the present invention, the transmit laser (i.e., laser) of a SFP device can be turned off during periods of inactivity (e.g., traffic served by the SFP device is low or non-existent). In another embodiment, the laser of the SFP device can be pulsed at a defined rate until the SFP device is connected to another device (e.g., until a communication link is established). In this manner, embodiments of the present invention can provide for saving small amounts of energy over a large number of ports and, thus, can contribute to providing a substantial power savings in a fiber Ethernet network system. Although the power savings associated with the present invention are relatively small, the current environment with the coming of USA Energy Star and EU Code of Conduct are making it mandatory for companies to find any power savings possible. Furthermore, the relatively large savings required by these rules will only be met with a sum of small savings.

In one embodiment of the present invention, a method for saving power in a fiber ports of a network system comprises at least one data processing device of the network system accessing, from memory coupled to the at least one data processing device, instructions causing the at least one data processing device to implement a power savings mode. The power savings mode includes determining an instance of a period of inactivity for a fiber port of the network system, terminating power delivery to a transmit laser of an SFP (small form-factor pluggable) device of the fiber port during at least a portion of the period of inactivity, and maintaining power delivery to the SFP device while power delivery to the transmit laser is terminated.

In another embodiment of the present invention, a network system comprises memory, at least one data processing device coupled to the memory, and instructions accessible from the memory by the at least one data processing device. The instructions are configured for causing the at least one data processing device to carry out operations for determining an instance of a period of inactivity for a fiber port of the network system, terminating power delivery to a transmit laser of an SFP device of the fiber port in response to the fiber port exhibiting the period of inactivity, and maintaining power delivery to the SFP device while power delivery to the transmit laser is terminated.

In another embodiment of the present invention, a non-transient computer-readable media having tangibly embodied thereon and accessible therefrom a set of instructions interpretable by at least one data processing device. The set of instructions configured for causing the at least one data processing device to carry out operations for determining an instance of a period of inactivity for a fiber port of the network system, terminating power delivery to a transmit laser of an SFP device of the fiber port during at least a portion of the period of inactivity, and maintaining power delivery to the SFP device while power delivery to the transmit laser is terminated.

These and other objects, embodiments, advantages and/or distinctions of the present invention will become readily apparent upon further review of the following specification, associated drawings and appended claims.

DETAILED DESCRIPTION OF THE DRAWING FIGURES

Implementing power saving modes of operation as provided by embodiments of the present invention must overcome several challenges. One such challenge relates to SFP device lasers taking a relatively long time to stabilize at power on compared to packet transmission rates. Another such challenge relates to latency being added due to time periods associated with laser stability and data buffering. Another such challenge relates to networks rarely being truly idle. Still another such challenge relates to far end devices needing to see that a link is active even when there is no data transmission. Yet another such challenge relates to available power savings on each port being relatively small and thus difficult to attain.

Embodiments of the present invention actively implement a power savings mode for SFP devices of a fiber Ethernet network system and/or other type(s) of suitable configured fiber-enabled network system. In the context of the present invention, an SFP device includes both SFP devices and SFP+ devices. When traffic served by the SFP device is low or non-existent, embodiments of the present invention can turn off the laser of a SFP device. Similarly, embodiments of the present invention can pulse the laser of the SFP device at a defined rate until a communication link is established between the SFP device and another device. Through such modes of power saving, embodiments of the present invention can contribute to providing a substantial power savings in a fiber Ethernet network system with minimal adverse implications relative to operation of the fiber Ethernet network system.

Figure 1:
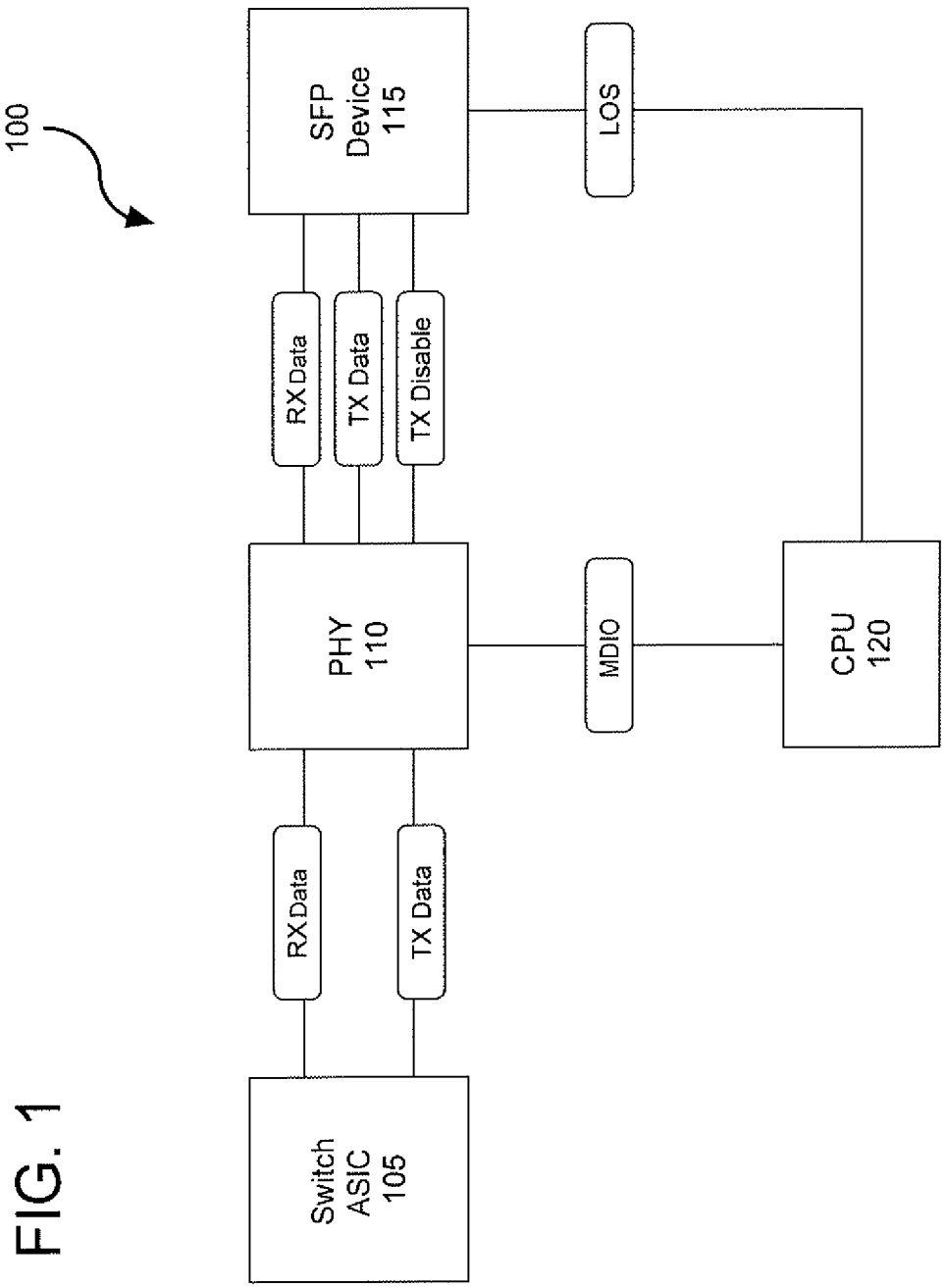
FIG. 1 is a diagrammatic view shows an embodiment of a logical hardware configuration 100 for a typical fiber port of a network system

FIG. 1 shows an embodiment of a logical hardware configuration 100 for a typical fiber port of a network system. The logical hardware configuration 100 includes a Switch ASIC (application specific integrated circuit) logical component 105, a physical layer (PHY) logical component 110, a SFP device logical component 115, and a CPU (central processing unit) logical component 120. Each one of the logical components can comprise firmware, software executable on a hardware device, hardware, and/or the like. The PHY logical component 110 is coupled between the Switch ASIC logical component 105, the SFP device logical component 115, and the CPU logical component 120 for enabling communication of information (e.g., data, signals, and the like) therebetween. Examples of signals for such communication include, but are not limited to, transmit data signals (TX Data), receive data signals (RX Data), transmit enable signals (TX enable), Management data input/out pot signals (MDIO signals), Loss of Signal signals (LOS), and the like. It is disclosed herein that the Switch ASIC logical component 105, the PHY logical component 110, the SFP device logical component 115, and the CPU logical component 120 can each be embodied within a respective device, each of which can include one or more functional modules. It is also disclosed herein that the logical hardware configuration 100 can include a MAC logical component rather than the Switch ASIC 105.

Operation of the SFP logical component 115 is governed by a standard that provides a Transmit Disable (TX_Disable) signal configured for allowing the transmission laser of a SFP device to be selectively powered down. Embodiments of the present invention utilize the TX Disable signal for implementing the power saving modes disclosed herein. It is important to note that known (i.e., prior art) implementations of the standard governing operation of the SFP device 115 do not provide a means to disable a receiver of the SFP logical device 115 without powering down the entire SFP device 115.

The switching ASIC logical component 105 communicates with the PHY logical component via a constant stream of symbols. Most of these symbols represent bytes of data. Other symbols do not contain data but are used for control. In the case of the logical hardware configuration 100 including a MAC logical component rather than the Switch ASIC 105, IEEE 802.3az provides for a special idle symbol (e.g., in accordance with XAUI standard symbology) to communicate from a MAC logical component to the PHY logical component for allowing the SFP logical device 115 to go into an idle mode. The same special idle symbol could be used or a sequence of control symbols could be used to indicate to the PHY logical component 110 that the laser of the SFP device logical component 115 should be disabled.

Figure 2:
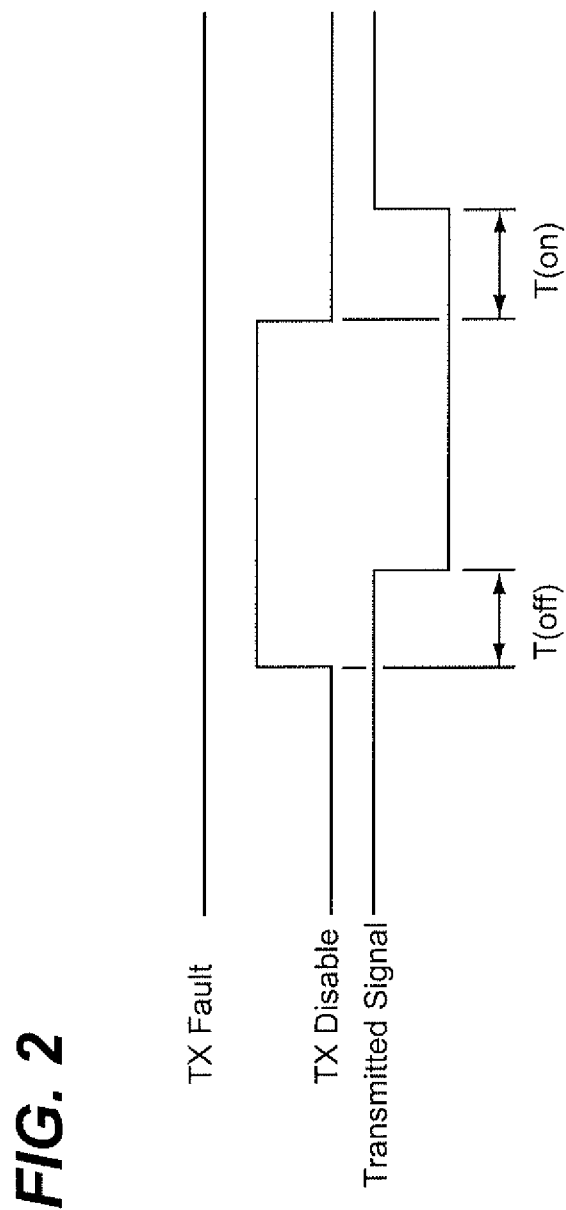
FIG. 2 is a timing sequence diagram showing a Transmit disable signal for SFP device laser output of a laser port operated in accordance with an embodiment of the present invention.

FIG. 2 shows a timing sequence diagram for the SFP device laser output based on the TX Disable signal discussed above being driven high with respect to a TX fault signal. As shown, there is physical (i.e., finite) time needed to both shut down the SFP device laser and to power it back up. For a typical SFP device, the times needed for shutdown (T(off)) and power-up (T(on)) are about 10 microseconds and 1 millisecond, respectively. For a typical SFP+ device, the times needed for shutdown (T(off)) and power-up (T(on)) are about 10 microseconds and 2 millisecond, respectively. As can be seen, the shutdown time (T(off)) for each type of device is $\frac{1}{100}^{th}$ of the power-up time (T(on)). Because the shutdown time is effectively negligible in comparison to the power-up time, it can be seen that time-sensitive issues associated with selectively shutting down and powering up a laser of a SFP device will be largely based on the power-up time as opposed to the shutdown time.

Still referring to the SFP/SFP+ devices above, powering savings when the SFP device laser is off is about 0.13 watts (i.e., 130 milliwatts). While the per-laser power savings are relatively small, the power savings for a corresponding 48-port switch would be about 6.24 watts. Because the source of power savings can be difficult to find, desirable and effective power savings can be obtained by adding many small power savings from various power savings approaches such as those power savings resulting from embodiments of the present invention.

A typical SFP device can transfer a packet of data in about $\frac{1}{1,488,096}$ of a second (i.e., about 671 nano-seconds). Accordingly, during a 1 ms duration of time required for laser stabilization on power up, as many as 1,488 packets could be waiting to be sent. This is beyond the capabilities of most switching ASICs to buffer, which shows the importance of having a proper detection algorithm to find entry and exit of the power savings modes.

It is also important to note that jitter and latency are becoming more important for networks than bandwidth because traffic includes real time video and audio. Jitter relates to the difference in end-to-end between packets within a flow while latency refers to the actual delay of a packet through the network. In this regard, the 1 ms delay to restart a SFP device laser after detecting that a packet needs to be transmitted plus any buffering timeframe can add to a network's nominal jitter and latency.

Microsoft Windows and other similarly designed systems tend to have management and/or application level traffic all of the time. ARP (address resolution protocol) or other broadcasts can be very heavy on some networks. The power save mode should take this into account. In one embodiment, this can be implemented by buffering a small number of packets before re-enabling the SFP device laser (e.g., resoring power delivery thereto) and conducting data transmission. Balance is needed between this need for buffering prior to re-enabling the laser and the jitter requirements discussed above.

In general, fiber links are designed to never be idle. The only method to detect that link is maintained is by the receiver seeing idle symbols from the remote transmitter. These idle symbols are generated as pulses of light at normal transmission speed but with special bit patterns. When the transmitter is disabled, these pulses will not be sent and the remote receiver would normally see this as a loss of link. To prevent this, in one embodiment of the present invention, the two devices can negotiate at startup for both ends to support the power savings mode. These two devices also need to transmit periodically to detect any link breaks or changes. The required time to detect link breaks and re-converge a network is constantly shrinking. A 50 ms convergence is considered required for active flows primarily to maintain voice or video calls, which will typically be much longer than for inactive flows.

Discussed now is an embodiment of the present invention configured for turning off the laser of the SFP device when traffic served by the SFP device is low or non-existent. The logical hardware configuration 100 of FIG. 1 can provide for such functionality in a manner such that the SFP device logical component 115 needs no change from prior art standards. More specifically, the TX_Disable signal is used to selectively control the SFP device laser being turned off and turned on. Ideally, the SFP device logical component 115 would provide feedback to the PHY logical component 110 that the SFP device laser is stabilized. However, in the case where all input and output locations of the PHY logical component 110 and/or the SFP device logical component 115 are already being used, the method for determining this timing would be for the CPU logical component 120 to read the stabilization time (e.g., from its programmable read only memory) on initialization and program that timing information into the PHY logical component 110.

The TX_Disable signal is driven by the PHY logical component 110. When the PHY logical component 110 receives a certain number of special idle symbols (i.e., C(Sidle)) on the XAUI interface with the Switch ASIC 105, the PHY logical component 110 then initiates the TX_Disable mode. Once the PHY logical component 110 stops receiving the special idle symbols, it clears the TX_Disable signal. The special idle symbols count is used to insure that enough special idle symbols are sent over the fiber for the far end device to register that the transmitting device (i.e., the SFP logical device 115) will be entering power save mode. The receive side of the PHY logical component 110 detects receipt of the special idle symbols and maintains the link for a period of time. Thereafter, a receiver of the PHY logical component 110 can resynchronize (e.g., to comma symbols) once the remote transmitter becomes active.

The switch ASIC 105 (or MAC) makes the decisions regarding the power savings mode and buffers packets while in this mode. When the port of the SFP logical device 115 is first activated, the Ethernet specification can allows for auto negotiation for mutually confirming support for power saving functionality. To this end, a corresponding bit (e.g., a feature bit) would need to be added to indicate that the port is capable of being the receiver side of this power savings mode. Because these bits are controlled by applicable standards, an alternative mode of implementation would be to use a vendor specific field (e.g., Link Layer Discovery Protocol (LLDP)) to transmit the bit information indicating that this port is capable of being the receiver side of this power savings mode.

Figure 3:
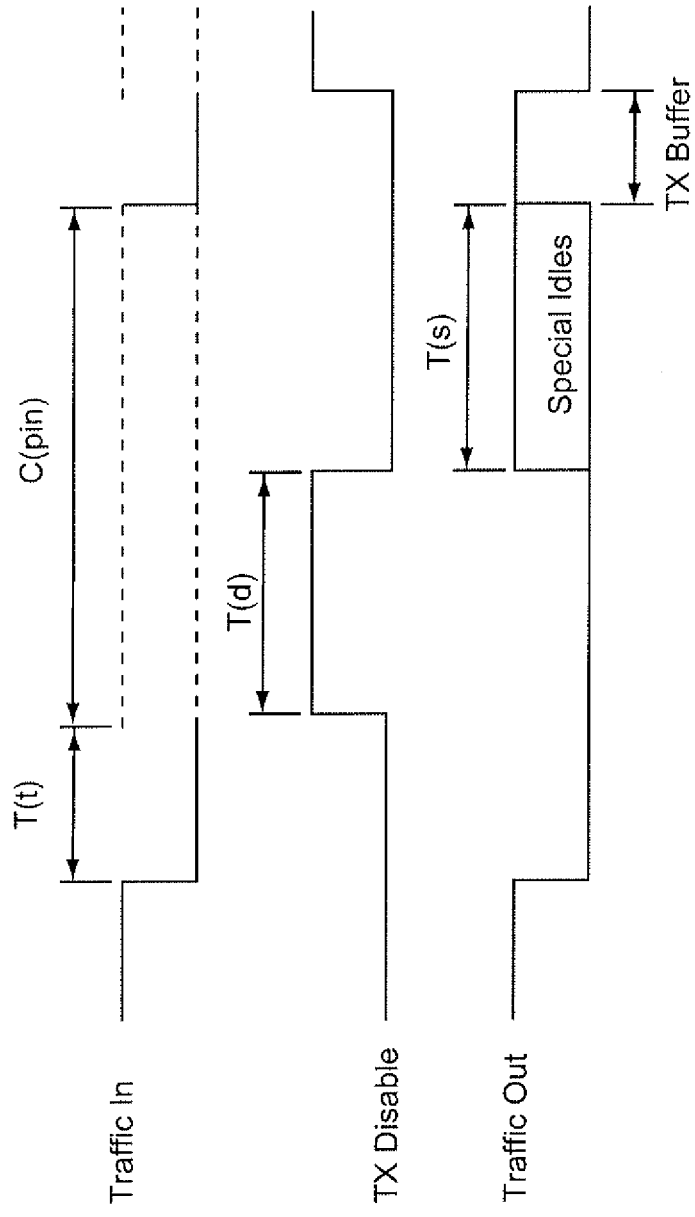
FIG. 3 shows a timing sequence diagram showing a timing sequence for selectively turning off and turning on a laser of an SFP device during periods of inactivity.

FIG. 3 shows a timing sequence diagram for an embodiment of running states for selectively turning off and turning on the laser of the SFP device logical component 115 when traffic served by the SFP device logical component 115 is low or non-existent. Whenever a packet finishes transmission to the PHY an idle timer T(t) is started. Until the idle timer T(t) expires, the switch ASIC logical component 105 stays in this idle timer state, which is State 1. When the switch ASIC logical component 105 determines that the power savings mode (i.e., selective shutdown of the SFP device laser) is to be implemented, it starts a power down timer T(d) and starts a packet buffered counter C(pin), which is State 2. In State 3, the Switch ASIC 105 sends special idle symbols to the PHY logical component 110 (e.g., over a XAUI interface) until one of the following occurs: A.) the power down timer expires, B.) a packet with high quality of service/differential service is waiting to be sent, or C.) the packet counter C(pin) increments by an amount that is more than allowed. The ASIC logical component 105 stops sending special idles and a stabilization timer T(s) is started, which is State 4. At State 5, the ASIC logical component 105 sends comma symbols to ensure correct link on the receiving end. The process remains in State 5 until the stabilization timer expires. Any packets in the buffer are transmitted. If the reasons for advancing from State 3 were reason B or reason C, process returns to State 1 after the buffered packets are transmitted. To help minimize jitter, the idle timer can be enlarged if the reason for advancing from State 3 was reason B and the specified quality of service was not for network control. The reason for this change in state is that these conditions likely indicate a high priority flow is starting. If the reason for advancing from State 3 was reason A, then the ASIC logical component 105 returns to State 2.

One consideration with the timing sequence depicted in diagram 300 is that the MAC buffers the packets until the laser is stabilized. This buffering can cause data loss if the traffic came in a burst beyond the buffer capability. A sufficient idle check can be used for minimizing the possibility of data loss, as large bursts of data are less probable after a long idle period.

Discussed now is an embodiment of the present invention configured for pulsing the laser of the SFP device at a low rate until link is established. The logical hardware configuration 100 of FIG. 1 can provide for such functionality in a manner such that the SFP device logical component 115 needs no change from prior art standards. As discussed above, SFP devices are configured with a TX DISABLE signal, which allows for selectively powering down the SFP device laser. As also discussed above, such powering down of the SFP laser can save about 0.13 watts during power down periods, which results in a power savings of about 6.3 watts for 48 ports without link.

Figure 4:
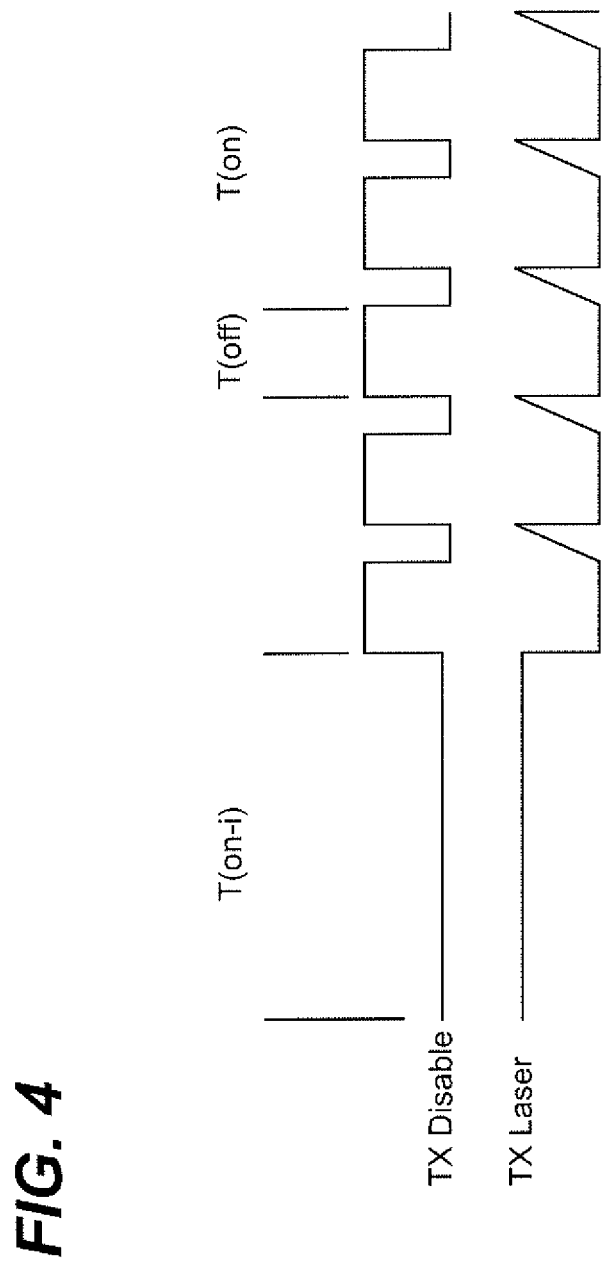
FIG. 4 shows a timing sequence diagram showing a timing sequence for pulsing a laser of a SFP device at a low rate until a communication link is established.

Referring to the timing sequence diagram of FIG. 4, when a fiber Ethernet port of a near-side SFP device (i.e., the SFP device) is first activated, the transmitter of the SFP device remains turned on, as normal, for an initial period of time T(on-i). If the receive side of the port has a Loss of Signal pin high (i.e., LOS signal), then the port will enter a pulse TX mode. In this pulse TX mode, the transmitter will cycle between a period of time in which the transmit laser is off (i.e., T(off)) and a period of time in which it is on (i.e., T(on)). In this manner, the transmit laser of the SFP device will be pulsed between a powered up condition and a shut down condition. As shown in FIG. 4, T(off) is preferably, but not necessarily, greater than T(on). As soon as the receive side of the port sees a change in LOS signal indicating light received from a remote system, the SFP device will be set for a TX enabled state for the same (or could be different) period of time as T(on-i) to allow the port to establish a link with the remote system. This laser pulsing functionality saves power and accomplishes the requirement that a remote device be able to detect presence of the near-side SFP device for detecting link/signal.

In one embodiment, the CPU logical component (FIG. 1), which can be a computer readable instructions (e.g., software), is in control of the laser pulsing functionality. However, it is disclosed herein that such control can be implemented as a state machine within the PHY logical component 110 or as a state machine within the Switch ASIC logical component 105. For such a PHY or MAC type of implementation, an LOS signal would need to be provided to the respective logical component (e.g., the PHY logical component 110 or the Switch ASIC logical component 105) or these logical components could substitute it with link/comma symbols.

With respect to the CPU-based control of the laser pulsing functionality, the signals used in this implementation are LOS signal, TX_Disable, and Link. The LOS signal originates on the SFP logical component 115. This signal is set by the SFP device to high when the receiver within the SFP device does not detect light. It is not dependent on symbols as does the actual link. In certain implementations, the LOS signal is connected to a CPU interrupt, which allows monitoring for short duration changes. The TX_Disable signal originates on the PHY logical component 110 or could be provided directly to the CPU logical component 120. When this signal is high the SFP device laser is powered off. When provided directly to the PHY logical component 110, the CPU has access to signals via a MDIO (management data input/output) interface. The Link signal, which is usually within the switching ASIC (or MAC), can be monitored as a backup to the LOS signal. If the two signals disagree the transmitter is preferably be left enabled, which is for solving the real world issues where some older SFP device's LOS signal is not reliable or where the CPU does not receive interrupts from a change in LOS signal.

Figure 5:
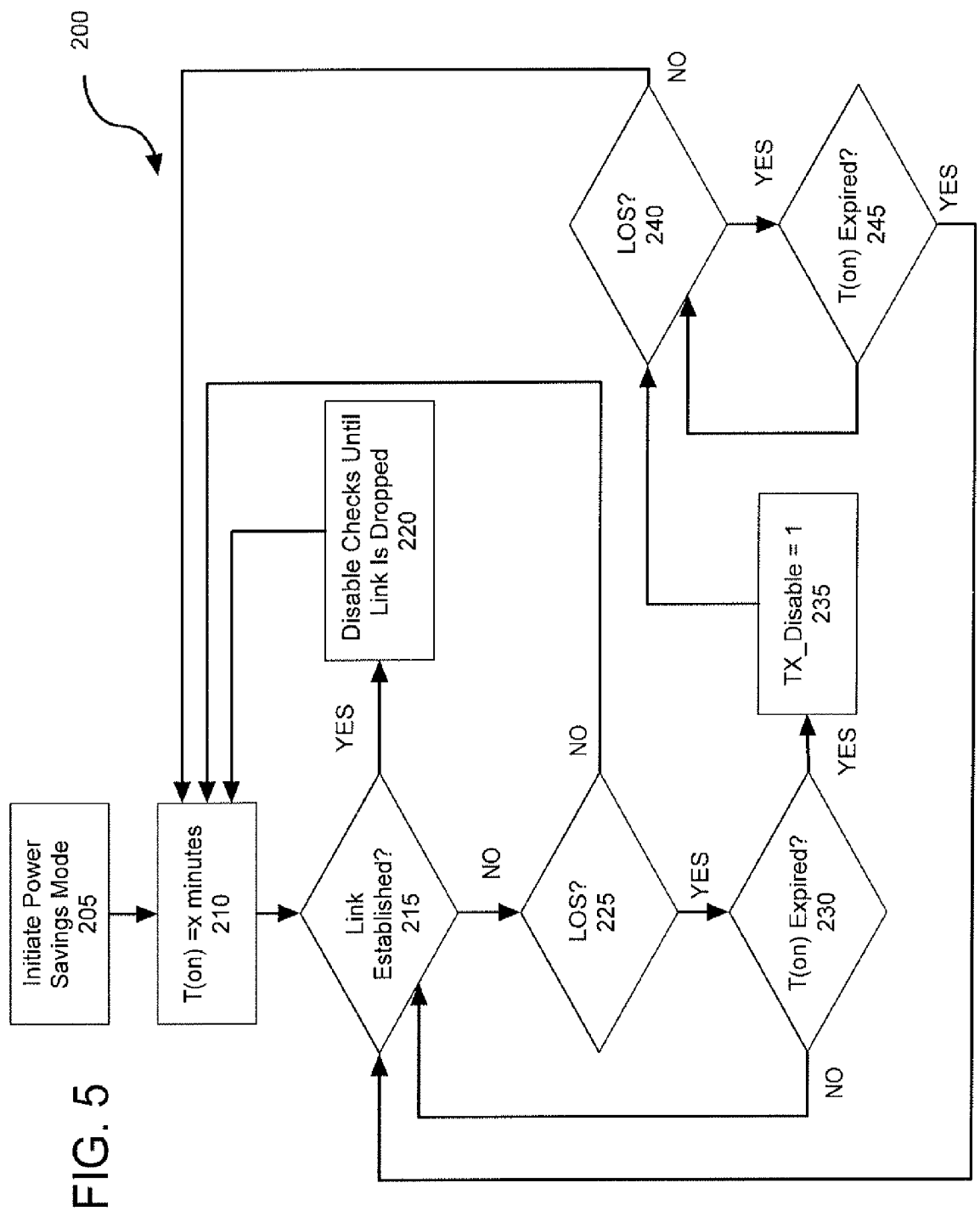
FIG. 5 is a flow diagram view showing a state machine methodology configured for enabling pulsing of the laser referred to in reference to FIG. 4.

FIG. 5 shows an embodiment of a state machine methodology 200 configured for enabling pulsing of the laser of the SFP device at a low rate until link is established. At a block 205, a power management module of a fiber Ethernet network system initializes an SFP device of the system as normal turning on the transmitter (i.e., laser transmitter) when a port is enabled (i.e., booted up). A first countdown timer T(on) is then set to an initial check duration (e.g., 1 minute) at a block 210. If at a block 215 it is determined that a link is established, the state machine methodology 200 is disabled at a block 220 and returns to the block 202 (i.e., resetting countdown timer) when the link is dropped. At a block 225, if a receiver of the SFP device detects that a LOS signal is low (i.e., light detected), the state machine methodology 200 returns to the block 202 (i.e., resetting countdown timer). Specifically, at the block 215, if light is detected in the receive path, the transmit laser is maintained in an active state to allow link to occur. Optionally (not specifically shown), if it is determined at the block 225 that a link is established, the state machine methodology 200 can be disabled at a block 220 and can return to the block 202 (i.e., resetting countdown timer) when the link is dropped.

If at the block 225 it is determined that the LOS signal is high (i.e., no light detected) and it is determined at a block 230 that the first countdown timer T(on) has not expired, the state machine methodology 200 returns to the block 215 Otherwise, if it is determined at the block 230 that the first countdown timer T(on) has expired, the transmitter is disabled at a block 235 and a second countdown timer T(off) is set to specify an allowed power down time for the transmitter (e.g., 5 seconds). The second countdown timer T(off) is the time it could take a new connection to be recognized. It is disclosed herein that the countdown timer can be set to a different time that influences responsiveness of the state machine methodology 200 (e.g., setting the countdown timer to a lesser value to increase response when plugging in cables). Thereafter, the state machine methodology 200 continues to a block 240 for determining if the receiver detects link or the LOS signal is low.

At the block 240, if the receiver detects that the LOS signal is low (i.e., light detected), the state machine methodology 200 returns to the block 202 (i.e., resetting countdown timer). Specifically, at the block 240, if light is detected in the receive path, the transmit laser is maintained in an active state to allow link to occur. Optionally (not specifically shown), if it is determined at the block 240 that a link is established, the state machine methodology 200 can be disabled at the block 220 and can return to the block 202 (i.e., resetting countdown timer) when the link is dropped. If at the block 240 it is determined that the LOS signal is high (i.e., no light detected) and it is determined at a block 245 that the first countdown timer T(on) has not expired, the state machine methodology 200 returns to the block 240 Otherwise, if it is determined at the block 245 that the first countdown timer T(on) has expired, the first countdown timer is set to a minimum period of time to active the remote end if connected and the method returns to the block 215. This setting for the first countdown timer needs to be longer than the time it takes the laser to stabilize (e.g., about 2 ms) plus it needs to be long enough for the remote SFP device to detect light and the remote CPU to see a corresponding interrupt. For example, this setting can be about 3 ms if both the receiver and transmitter run interrupts thereby cycling the laser off for the second countdown timer value (e.g., T(off)=5 s) and on for the first countdown timer value (e.g., T(on)=3 ms) until light is detected from the remote end.

With the cycle of 5 seconds off and 3 milliseconds on the power is off 99.94% of the time. For the sample SFP device which saves 0.13 watts when off this saves and average of 0.120 watts per port over time. In this manner, cycling of the transmit laser can contribute to providing a substantial power savings in a fiber Ethernet network system with minimal adverse implications relative to operation of the fiber Ethernet network system.

Referring now to instructions processible by a data processing device, it will be understood from the disclosures made herein that methods, processes and/or operations adapted for carrying out power saving functionality as disclosed herein are tangibly embodied by non-transitory computer readable media having instructions thereon that are configured for carrying out such functionality. In one specific embodiment, the instructions are tangibly embodied for carrying out the power saving functionality disclosed in reference to FIGS. 2 and 3. In another embodiment, the instructions are tangibly embodied for carrying out the power saving functionality disclosed in reference to FIGS. 4 and 5. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. This, in at least one embodiment, the computer readable media is a non-transitory computer readable media. Accordingly, embodiments of non-transitory computer readable media in accordance with the present invention include a compact disk, a hard drive, RAM or other type of storage apparatus that has imaged thereon a computer program (i.e., instructions) adapted for carrying out power saving functionality in accordance with the present invention.

It is disclosed herein that such instructions can be embodied within a fiber Ethernet network system (e.g., a logical hardware configuration thereof and/or a power management module thereof). For example, the fiber Ethernet network system can include one or more data processing devices coupled to a memory apparatus and such instructions can be accessible by the one or more data processing devices from the memory apparatus. Such memory and/or data processing device(s) can be integrated within and/or distributed throughout one or more components of a fiber Ethernet network system (e.g., a switch ASIC (or MAC) system component, a PHY system component, a CPU system component, and/or a SFP device system component). In this manner, the fiber Ethernet network system can be configured for carrying out power savings functionality as disclosed herein.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for saving power in a fiber ports of a network system, comprising:
   at least one data processing device of the network system accessing, from memory coupled to said at least one data processing device, instructions causing said at least one data processing device to determine an instance of a period of inactivity for a fiber port of the network system;
   said at least one data processing device accessing, from said memory, instructions causing said at least one data processing device to terminate power delivery to a transmit laser of an SFP (small form-factor pluggable) device of the fiber port during at least a portion of the period of inactivity;
   said at least one data processing device accessing, from said memory, instructions causing said at least one data processing device to maintain power delivery to the SFP device while power delivery to the transmit laser is terminated;
   said at least one data processing device accessing, from said memory, instructions causing said at least one data processing device to determine when the period of inactivity has ended;
   said at least one data processing device accessing, from said memory, instructions causing said at least one data processing device to buffer a plurality of packets of information in response to determining that the period of inactivity has ended; and
   said at least one data processing device accessing, from said memory, instructions causing said at least one data processing device to discontinue said power delivery termination after buffering said packets.

2. The method of claim 1 wherein:
   the fiber port is without link to a remote device during the period of inactivity; and
   causing said at least one data processing device to terminate said power delivery includes causing said at least one data processing device to cycle the transmit laser between a powered up state and a powered down state during at least a portion of the period of inactivity.

3. The method of claim 2, further comprising:
   said at least one data processing device accessing, from said memory, instructions causing said at least one data processing device to output from the transmit laser a link detection signal for reception by a remote device while the transmit laser is in the powered up state during the period of inactivity.

4. The method of claim 1, further comprising:
   said at least one data processing device accessing, from said memory, instructions causing said at least one data processing device to confirm that a remote device with which the fiber port has a link established will not report a loss of link during the period of inactivity.

5. The method of claim 4 wherein:
   the fiber port is without link to a remote device during the period of inactivity; and
   said at least one data processing device accessing, from said memory, instructions causing said at least one data processing device to terminate said power delivery includes said at least one data processing device accessing, from said memory, instructions causing said at least one data processing device to cycle the transmit laser between a powered up state and a powered down state during at least a portion of the period of inactivity.

6. A network system, comprising:
   memory;
   at least one data processing device coupled to said memory; and
   instructions accessible from said memory by said at least one data processing device, wherein said instructions are configured for causing said at least one data processing device to carry out operations for:
      determining an instance of a period of inactivity for a fiber port of the network system;
      terminating power delivery to a transmit laser of an SFP device of the fiber port in response to the fiber port exhibiting the period of inactivity;
      maintaining power delivery to the SFP device while power delivery to the transmit laser is terminated;
      determining when the period of inactivity has ended;
      buffering a plurality of packets of information in response to determining that the period of inactivity has ended; and
      discontinuing said power delivery termination after buffering said packets.

7. The network system of claim 6 wherein:
   the fiber port is without link to a remote device during the period of inactivity; and
   causing said at least one data processing device to carry out operations for terminating said power delivery includes causing said at least one data processing device to carry out operations for cycling the transmit laser between a powered up state and a powered down state during at least a portion of the period of inactivity.

8. The network system of claim 6 wherein said set of instructions are further configured for causing said at least one data processing device to carry out operations for:

confirming that a remote device with which the fiber port has a link established will not report a loss of link during the period of inactivity.

9. The network system of claim 8 wherein:
the fiber port is without link to a remote device during the period of inactivity; and
causing said at least one data processing device to carry out operations for terminating said power delivery includes causing said at least one data processing device to carry out operations for cycling the transmit laser between a powered up state and a powered down state during at least a portion of the period of inactivity.

10. The network system of claim 9 wherein said set of instructions are further configured for causing said at least one data processing device to carry out operations for:
outputting from the transmit laser a link detection signal for reception by the remote device while the transmit laser is in the powered up state during the period of inactivity.

11. A non-transitory computer-readable media having tangibly embodied thereon and accessible therefrom a set of instructions interpretable by at least one data processing device, said set of instructions configured for causing said at least one data processing device to carry out operations for:
determining an instance of a period of inactivity for a fiber port of the network system;
terminating power delivery to a transmit laser of an SFP (small form-factor pluggable) device of the fiber port during at least a portion of the period of inactivity;
maintaining power delivery to the SFP device while power delivery to the transmit laser is terminated;
determining when the period of inactivity has ended;
buffering a plurality of packets of information in response to determining that the period of inactivity has ended; and
discontinuing said power delivery termination after buffering said packets.

12. The computer-readable media of claim 11 wherein:
the fiber port is without link to a remote device during the period of inactivity; and
causing said at least one data processing device to carry out operations for terminating said power delivery includes causing said at least one data processing device to carry out operations for cycling the transmit laser between a powered up state and a powered down state during at least a portion of the period of inactivity.

13. The computer-readable media of claim 11 wherein said set of instructions are further configured for causing said at least one data processing device to carry out operations for:
confirming that a remote device with which the fiber port has a link established will not report a loss of link during the period of inactivity.

14. The computer-readable media of claim 13 wherein:
the fiber port is without link to a remote device during the period of inactivity; and
causing said at least one data processing device to carry out operations for terminating said power delivery includes causing said at least one data processing device to carry out operations for cycling the transmit laser between a powered up state and a powered down state during at least a portion of the period of inactivity.

15. The computer-readable media of claim 14 wherein said set of instructions are further configured for causing said at least one data processing device to carry out operations for:
outputting from the transmit laser a link detection signal for reception by the remote device while the transmit laser is in the powered up state during the period of inactivity.

* * * * *